Patented Sept. 28, 1943

2,330,714

UNITED STATES PATENT OFFICE 2,330,714

PREPARATION OF THIOANILINE

Lee C. Holt, Wilmington, Del., assignor to E. I. du Pont de Nemours & Company, Wilmington, Del., a corporation of Delaware No Drawing. Application January 13, 1942, Serial No. 426,647

6 Claims. (Cl. 260—580)

This invention relates to the preparation of thioaniline by the catalytic reduction of amino-nitro'-diphenylsulfide.

The standard method for making thioaniline involves the reduction of 4-amino-4'-nitro-diphenylsulfide with iron. In that process there is produced, along with the thioaniline, a large amount of iron oxide. The thioaniline is comparatively non-volatile and is relatively insoluble in water so that it cannot easily be separated from the iron and iron oxide. Among the various methods which have been tried, some of which attained a certain measure of success and others of which were unsuccessful, are steam distillation, which proved impossible; solution in organic solvents, which is expensive and particularly difficult because of the slimy nature of the iron oxide suspension; solution in dilute sulfuric acid which is impractical because of the low solubility of the sulfate in water, which requires great volumes; and extraction with hydrochloric acid, filtration, and precipitation by sodium sulfate. The last is the best of the known methods but has the objection that it is difficult to wash the iron salts out of the sulfate cake, which requires much time and a large amount of sodium sulfate solution.

The object of this invention is to prepare thioaniline by a simple and effective method. Other objects of the invention will be in part apparent and in part hereinafter set forth.

Although it would have been thought that the sulfur in the amino-nitro'-diphenylsulfide would poison a reducing catalyst, it is my surprising discovery that thioaniline can be made by the catalytic reduction of amino-nitro'-diphenylsulfide with hydrogen. The reduction is carried out satisfactorily in methanol as a solvent but other solvents can be used. In the process the diphenylsulfide is put in a pressure chamber with the solvent, a reducing nickel catalyst and hydrogen. The mixture is heated under pressure for a period of time sufficient to complete the reduction. The solids in the reaction mass are removed by filtration, the solvent is recovered by distillation and the thioaniline is isolated by drowning in water. The thioaniline so produced is satisfactory for use in azo colors.

The following example illustrates but does not limit the invention.

*Example*

461 parts of a 78% paste (364 parts of 100% 4-amino-4'-nitro-diphenylsulfide), which as a dry product had a setting point by maximum rise of 137° C., was charged to an autoclave with 1200 parts of methanol, 11 parts of reduced nickel catalyst supported on diatomaceous earth and 6 parts of ground limestone. The air in the autoclave was replaced by hydrogen and the temperature raised to 70° C. The hydrogen pressure was raised to 500 lbs. At about 80° C. reduction began and was complete in three hours, during which time the temperature rose to 105° C. The autoclave was cooled below the boiling point of methanol, the charge removed and filtered to remove the catalyst and limestone. Methanol was recovered by distillation up to 75° C. in the vapor stream without the use of a column, 840 parts of 95% methanol being thus recovered. This was satisfactory for reuse in subsequent batches. The still residue was poured into cold water and a light gray, granular mass was obtained. This was filtered off and dried. The dry weight was 303 parts of thio-aniline, which is a weight yield of 95% of theory. The product had a setting point of 104° C. This was tested and found to be satisfactory for the manufacture of azo dyes.

The temperature of reduction may vary quite widely without injury to the product. In carrying out the reaction on a large scale the reduction has taken place mainly at 130 to 140° C., but that temperature is merely a desirable range, not a limitation.

Other reduction catalysts than reduced nickel may be used but reduced nickel is the common catalyst for hydrogen reductions and is at least as satisfactory as the others. Ethanol, isopropyl alcohol and toluene are satisfactory as solvents and illustrate the utility of organic solvents in general. The reduction can be carried out in water but proceeds slowly. For example 500 g. of nitro compound, 1400 cc. of water, 25 g. of catalyst and 3 g. of sodium acetate crystals were heated for 12 hours at 130°–135° C. under pressure. A 20% conversion of the nitro body was obtained.

The final product can be isolated as a sulfate by dissolving it in hydrochloric acid and precipitating by the addition of sodium sulfate.

This process produces thioaniline at low cost and with efficiency of labor and materials.

As many apparently widely different embodiments of this invention may be made without departing from the spirit and scope, it is to be understood that I do not limit myself to the specific embodiments thereof except as defined in the appended claims.

I claim:

1. The process of preparing thioaniline which comprises mixing 4-amino-4'-nitro-diphenylsulfide with methanol and a nickel catalyst on diatomaceous earth and limestone, subjecting the mixture to contact with an atmosphere composed substantially of hydrogen at a temperature of about 80° to about 140° C. and a pressure of about 500 lbs. per square inch, removing the catalyst and its carrier by filtration, removing the methanol by distillation, drowning the residue of the reaction mass in water and filtering off the thioaniline.

2. The process of preparing thioaniline which comprises mixing amino-nitro'-diphenylsulfide with a solvent and reducing it with hydrogen and a nickel catalyst at a temperature around 100° C. and at superatmospheric pressure, separating the reaction mass from the catalyst and solvent, drowning it in water and filtering off the thioaniline.

3. The process of preparing thioaniline which comprises mixing amino-nitro'-diphenylsulfide with a solvent and reducing it with hydrogen and a nickel catalyst at a temperature around 100° C. and at superatmospheric pressure, and isolating the thioaniline.

4. The process of preparing thioaniline which comprises mixing amino-nitro'-diphenylsulfide with a solvent and reducing it with hydrogen and a nickel catalyst.

5. The process of preparing thioaniline which comprises mixing amino-nitro'-diphenylsulfide with a solvent therefor, and reducing it with free hydrogen and a reduction catalyst.

6. The process of preparing thioaniline which comprises heating to reaction temperature a mixture of amino-nitro'-diphenylsulfide, an organic solvent, and a reducing catalyst in the presence of an atmosphere of hydrogen under pressure.

LEE C. HOLT.